No. 791,326.                                                             Patented May 30, 1905.

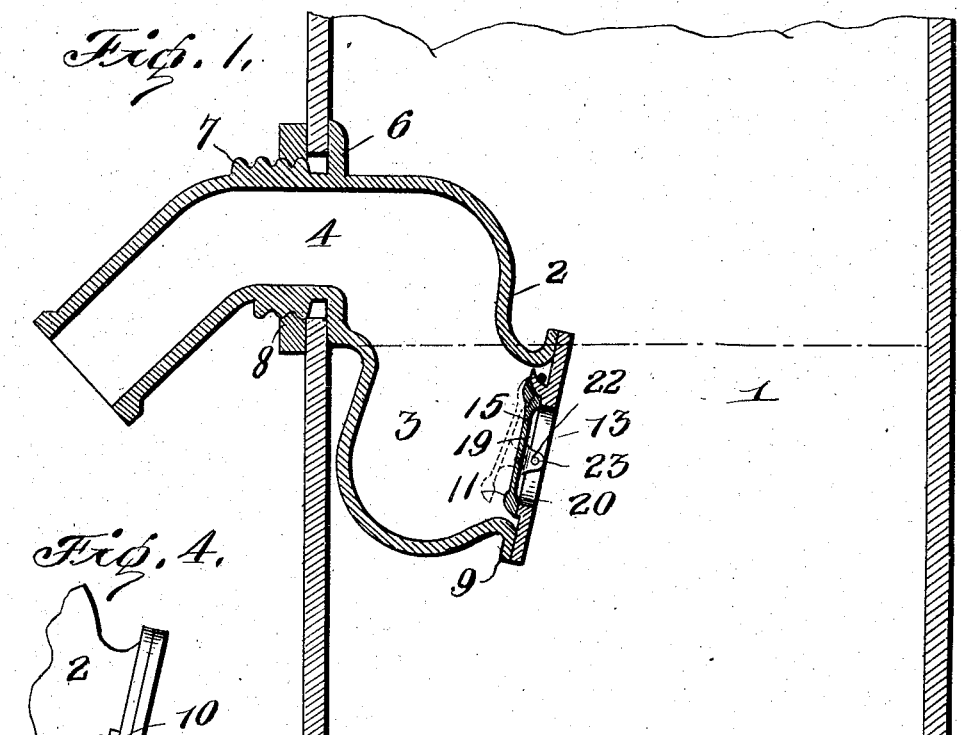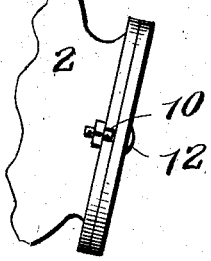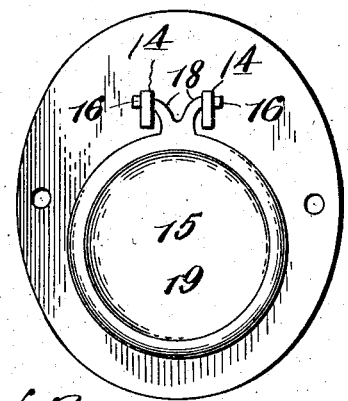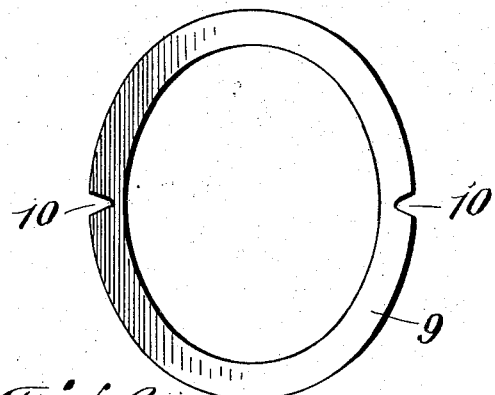

UNITED STATES PATENT OFFICE.

BERTRAM DALE, OF MILWAUKEE, WISCONSIN.

SEWER-TRAP.

SPECIFICATION forming part of Letters Patent No. 791,326, dated May 30, 1905.

Application filed December 19, 1904. Serial No. 237,522.

*To all whom it may concern:*

Be it known that I, BERTRAM DALE, a citizen of the United States, residing at Milwaukee, in the county of Milwaukee and State of Wisconsin, have invented certain new and useful Improvements in Sewer-Traps; and I do declare the following to be a full, clear, and exact description of the invention, such as will enable others skilled in the art to which it appertains to make and use the same.

My invention relates to sewer-traps, and more especially to that character of traps designed for connection to catch-basins and to prevent the contents of the sewer backing up into the catch-basin; and the objects of the invention are to simplify the construction and improve the efficiency of traps of the character referred to. These and other objects are attained by means of the construction illustrated in the accompanying drawings, in which—

Figure 1 is a vertical section of a catch-basin having my improved trap connected thereto, said trap being also shown in section. Fig. 2 is a plan view of the valve and the face-plate to which it is hinged. Fig. 3 is a plan view of the end of the trap and showing the bolt-openings for permitting the face-plate to be removably secured thereto, and Fig. 4 is a detail side view of the valve and its mounting.

Referring to the drawings for a more particular description of the invention, the numeral 1 designates a catch-basin, which may be of the usual or any suitable construction.

The trap is preferably of cast-iron and comprises a depending portion 2, forming a trap-chamber 3, and a tubular portion 4, extending from the upper end of said trap and curving downward at its outer end, as at 5. A flange 6 surrounds the tubular portion 4 at a point near the trap 2. A spirally-disposed rib 7 extends from near the flange 6 around the pipe to a sufficient distance to form screw-threads for the attachment of the trap to a catch-basin or to the side of a clay sewer-pipe. A locking ring or nut 8 may be turned up against the side of the catch-basin or sewer-pipe, and the trap is securely held in place with the trap-chamber 3 extending below the open end of the tubular portion 4.

The opening in the lower portion of the trap 2 is provided with an outwardly-extended flange 9, and at the sides of this flange bolt-openings 10 are formed. The face-plate or valve-seat 11 is preferably made of brass and is secured in place against the flange 9 by means of bolts 12, which pass through holes in the sides of the face-plate or seat and through the bolt-openings 10 in the flange 9. A central opening 13 is formed in the plate 11, and above said opening upwardly-extending hooks 14 are provided to serve as the pintle-bearings for the valve 15. The pintles 16 are formed on the upper end of the valve 15 and are adapted to be supported by and journaled in the hooks 14. The shank 17 of the pintles is curved, as at 18. The front face of the valve 15 is depressed, as at 19, to form a smooth surrounding rim or bearing 20, which may be ground to a close fit upon the valve-seat 21. A lug 22, having an opening 23 therein, may be utilized for holding the valve in closed position for shipping, a piece of wire being passed through the opening 23 and attached to the flange 9 in a manner to prevent the movement of the valve 15. It will be noted that owing to the inclination of the flange 9 the valve 15 when supported from the bearing-hooks 14 normally swings to a closed position by gravity or when there is a back pressure from the sewer and will open only when the water-line is sufficiently high in the catch-basin to force the valve open by water pressure or weight when there is no back pressure from the sewer.

Various changes in the form, proportion, and the minor details of construction may be resorted to without departing from the principle or sacrificing any of the advantages of this invention.

Having thus described my invention, what I claim as new, and desire to secure by Letters Patent, is—

1. A sewer-trap comprising a depending trap-chamber having an inclined opening therein and a flange surrounding said opening, a valve-seat secured to said flange, a valve hinged to said seat, a tubular portion extending from the upper portion of the trap and having a downwardly-curved terminal portion the opening in which is in a plane above the trap, and means for securing the trap to a catch-basin or sewer-trap, substantially as described.

2. A catch-basin trap consisting of a metal casting having a depending trap, an inclined opening therein, an outwardly-extended flange surrounding said opening, a valve-seat plate secured to said flange, upwardly-extending bearing-hooks on said plate, a valve provided with outwardly-extended pintles adapted to engage the hooks to hinge the valve, and a lug cast upon the front of the valve and provided with an opening, for the purpose described.

3. A sewer-trap comprising a depending trap-chamber, an inclined flange surrounding the opening therein, said flange having bolt-openings in the opposite sides thereof, a valve-seat or face-plate removably secured to said flange by means of bolts passing through holes in the valve-seat and the openings in said flange, a valve hinged to the valve-seat, a tubular extension at the upper end of the trap, and a spiral rib and locking ring or nut, substantially as described.

In testimony whereof I have hereunto set my hand in presence of two subscribing witnesses.

BERT. DALE.

Witnesses:
RICHARD ELSNER,
HENRY HEUMANN.